United States Patent [19]
Schultz

[11] Patent Number: 5,957,018
[45] Date of Patent: *Sep. 28, 1999

[54] PROCESS AND APPARATUS FOR CUTTING UP BY SHEARING OF ELEMENTS OF A NUCLEAR INSTALLATION

[75] Inventor: Jean-Claude Schultz, Equeurdreville, France

[73] Assignee: Compagnie Generale Des Matieres Nucleaires, Velizy-Villacoublay, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,729

[22] PCT Filed: Oct. 18, 1994

[86] PCT No.: PCT/FR94/01203

§ 371 Date: Mar. 5, 1997

§ 102(e) Date: Mar. 5, 1997

[87] PCT Pub. No.: WO95/11510

PCT Pub. Date: Apr. 27, 1995

[30] Foreign Application Priority Data

Oct. 19, 1993 [FR] France ................................... 93 12441

[51] Int. Cl.⁶ ................................ B26D 3/00; B26D 7/06
[52] U.S. Cl. ................................... 83/39; 83/49; 83/130; 83/437.2; 83/449; 83/916; 83/930
[58] Field of Search .............................. 83/916, 449, 39, 83/49, 446, 130, 129, 930, 437.2

[56] References Cited

U.S. PATENT DOCUMENTS 2,364,334  12/1944  Wold .......................................... 83/916
2,650,663   9/1953  Wales et al. .............................. 83/916
3,160,046  12/1964  Bredow ..................................... 83/130
3,264,919   8/1966  Pawelka et al. .......................... 83/916
3,672,247   6/1972  Cherel ......................................... 83/39
3,722,338   3/1973  Cherel ....................................... 83/930
3,855,684  12/1974  Kendall .................................... 83/930
4,143,571   3/1979  Oxenham ................................. 83/916
4,566,361   1/1986  Dubost et al. .
4,667,553   5/1987  Gerber et al. .............................. 83/49
4,968,204  11/1990  Griveau et al. .......................... 83/930
5,054,348  10/1991  Anciaux et al. .
5,060,546  10/1991  Tucoulat ................................... 83/930
5,170,560  12/1992  Allemann et al. ....................... 83/916

FOREIGN PATENT DOCUMENTS 0094883  11/1983  European Pat. Off. .
0347312  12/1989  European Pat. Off. .
0374334   6/1990  European Pat. Off. .
2187425   9/1987  United Kingdom .
79/00218  5/1979  WIPO .

Primary Examiner—Rinaldi I. Rada
Assistant Examiner—Sean Pryor
Attorney, Agent, or Firm—Pearne, Gordon, McCoy & Granger LLP

[57] ABSTRACT

A process and apparatus for cutting up an element used in the construction of a nuclear installation for dismantling. The element is placed on a support and pushed toward a shearing tool having a blade pitch angle of 30°. As the element is pushed, the blade performs a first shearing operation. Then a releasing stop controlled by a jack releases the element from the blade. Operation continues until the element is cut up.

16 Claims, 5 Drawing Sheets

PROCESS AND APPARATUS FOR CUTTING UP BY SHEARING OF ELEMENTS OF A NUCLEAR INSTALLATION

BACKGROUND OF THE INVENTION

The present invention relates to the cutting up by shearing of elements used in the construction of a nuclear installation. It more particularly relates to the cutting up of melting pots.

The dismantling of nuclear installations is a particular problem worrying the authorities responsible for safety and nuclear protection, as well as nuclear plant operators. For several decades, numerous dismantling means have been developed and experience has shown that it is necessary to improve existing dismantling equipment or create new equipment for this purpose. Numerous countries have started up research and development programs in this connection.

As nuclear installations are of different sizes and types, it is necessary to have a considerable variety of means in order to carry out the dismantling operations. They are generally carried out by cutting up using one of the numerous existing processes, i.e. thermal, electrothermal, pyrotechnic, mechanical, etc.

The choice of a particular cutting up process is a function of numerous criteria, namely the efficiency of cutting up, its cost, use constraints, the pollution level emitted and the material to be cut up.

It is known to carry out mechanical cutting up by using a circular saw, reciprocating saw, disk, abrasive cable and wheel and boring cutting tools. The weight and overall dimensions of these tools make them difficult to remotely handle.

Certain constituents of nuclear installations are particularly difficult to cut up. This may be due to the nature of the material forming them, their thickness and their state. This is particularly the case with melting pots made from alloys of nickel, chromium and iron, such as Inconel 601$^{(R)}$, which have a thickness of about 10 mm. In addition, spent melting pots have a residual glass deposit on their inner wall, which increases cutting difficulties. As a result it is at present virtually impossible to cut up these pots. Reciprocating saw tests have revealed that roughly two months are needed to cut up such a pot.

BRIEF SUMMARY OF THE INVENTION

The present invention makes it possible to obviate this difficulty by developing a novel cutting up process in connection with dismantling procedures, namely cutting up by shearing. This process and its application to an appropriate apparatus for receiving nuclear installation elements have permitted a remarkable improvement in the cutting up efficiency. It is also pointed out that a priori such an improvement was completely unexpected. Thus, shearing tests performed on spent Inconel 601 melting pots have demonstrated that only 24 hours were required for cutting up a pot instead of two months using the reciprocating saw, which is the presently used method.

The present invention therefore relates to a process for cutting up an element used in the construction of a nuclear installation with a view to its dismantling, characterized in that it comprises the following steps:

presentation and maintenance of the element in front of the cutting edge of the shearing tool, which is in the working position, simultaneously, pushing the element towards the cutting edge and manipulating the tool in order to carry out a first shearing operation on the element, at the end of the first shearing operation, release of the element from the shearing tool and return of the tool to the working position, optionally, a repetition of the preceding steps in order to carry out the number of shearing operations necessary.

The invention also relates to an apparatus for performing the above process, which is characterized in that it comprises a support for receiving the element, the support being equipped with a shearing tool controllable by control means, the apparatus also incorporating means for holding the element in front of the cutting edge of the shearing tool, means for pushing the element towards the cutting edge of the tool and means for releasing the element from the shearing tool.

Advantageously, the shearing tool is a blade traversing the support, the part of the support which faces the cutting edge serving as a counterblade.

The part of the support facing the cutting edge of the blade can be provided with a detachable wearing member, which permits a rapid replacement of the part of the support damaged by the cutting operation.

The wearing part can be provided with a slot enabling the blade to pass through the support.

During the shearing operation, if the blade is manipulated perpendicular to the support, its cutting edge is preferably inclined relative to the support.

The blade control means can comprise a jack, whose piston is detachably integral with the blade.

Advantageously, the holding means, release means and pushing means incorporate stops controlled by jacks.

BRIEF DESCRIPTION OF THE SEVERAL VIEWS OF THE DRAWINGS

The invention is described in greater detail hereinafter relative to non-limitative embodiments and the attached drawings, wherein show.

DESCRIPTION OF THE INVENTION

Figure 1:
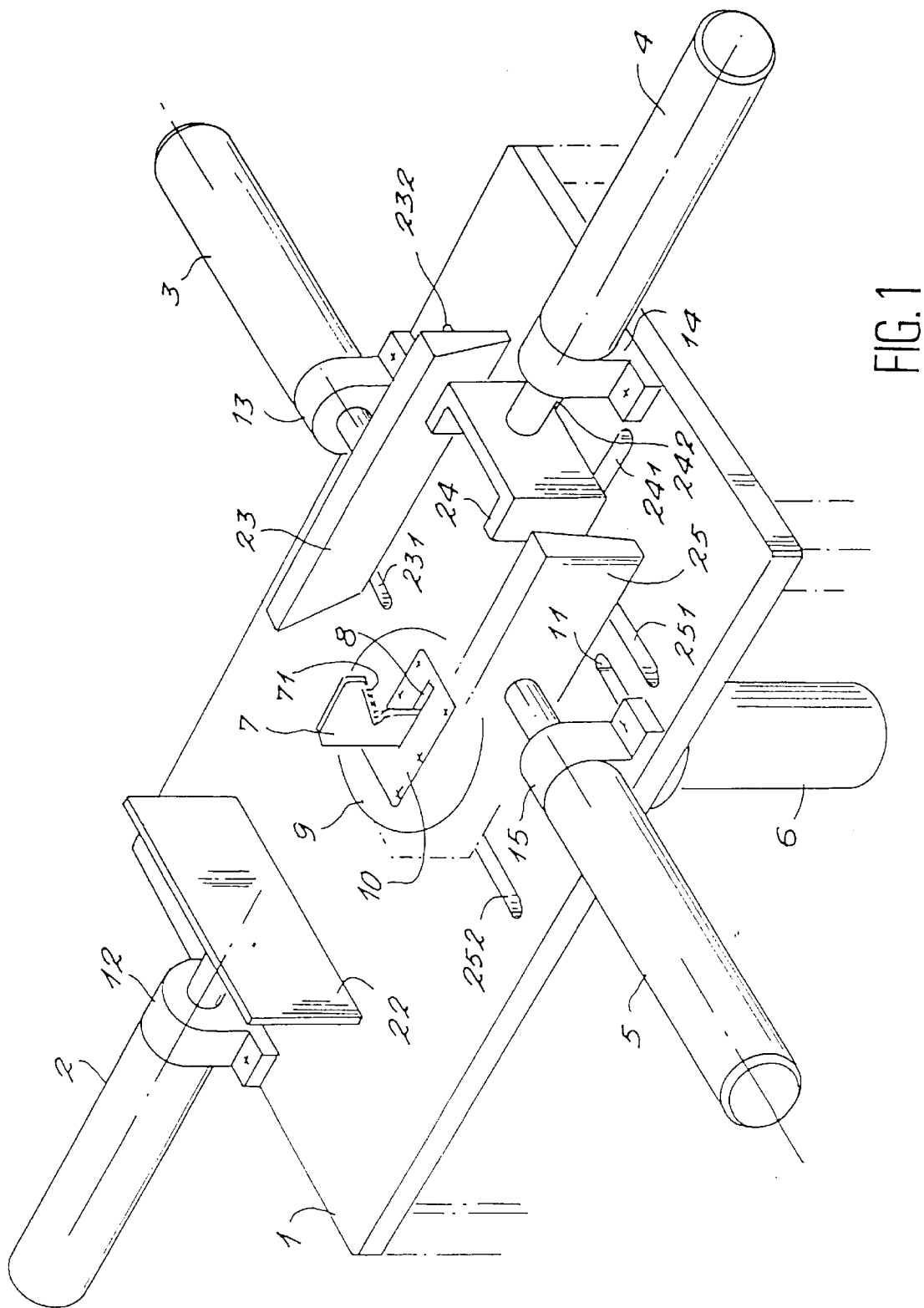
FIG. 1 An overall view of a cutting apparatus by shearing according to the invention.

The apparatus shown in FIG. 1 has a table 1 serving as a support for the element to be sheared. Four jacks 2, 3, 4 and 5, arranged orthogonally to one another, are fixed to the table 1 by clamps 12, 13, 14 and 15 respectively. These four jacks can have an identical travel, e.g. 500 mm. Although not visible in FIG. 1, the apparatus also incorporates a chute placed beneath the table and a tank for recovering chips produced during the cutting operation. A cutting jack 6 is placed beneath the table and kept perpendicular to the plane of the table by two pins (not shown). The cutting jack 6 controls the displacement of the shearing tool, here formed by a blade 7 traversing the table 1 due to the presence of the slot 8 and having a cutting edge 71.

Jacks 3 and 5 control the displacement of the stops 23 and 25, which are parallel to the blade 7 and are used for retaining the element to be sheared. As a function of the size of the elements to be cut up, the jacks 3 and 5 will be placed at a varying distance from the axis of the table 1 passing through the plane of the blade, by means of slots, such as 11, which permit the passage of fixing elements (not shown) of the clamps 13 and 15.

The stops 23 and 25 are guided in translation by guide slots, such as 231, 232, 251 and 252, by means of not visible extensions of the slots which penetrate these slots. For jacks 3 and 5, the operating pressure can be approximately 30 bars.

The jack 4 is used for pushing the element to be cut up towards the blade 7. It is shown permanently fixed to the table 1 by means of its clamp 14. It could also be regulatable with respect to the blade by placing the elements used for fixing the clamp in the slots 241 and 242 used for the guiding of the pressure pad 24. The latter is not as wide as the stops 23 and 25 and has a U-shape with not visible extensions penetrating the slots 241 and 242. The operating pressure of the jack 4 can be 100 bars.

The jack 2 is used for drawing back the element to be cut up when a cut has been made and the blade 7 is in the bottom position (not shown). In this case, the stop 22 integral with the rod of the jack 2 passes above the blade. The jack 2 is shown permanently fixed to the table, but could also be displaceable if the table was equipped with slots, as for the other jacks. The same applies with respect to the stop 22, which is not guided here by the slots of the table, its function not requiring such a high quality displacement precision as the other pressure and maintaining systems for the element to be cut up. The operating pressure of the jack 2 can be approximately 100 bars.

The jacks 2, 3, 4 and 5 can advantageously be connected to a hydraulic station having oil/water exchangers (not shown). This station permits the concatenation of the successive, cutting up operations:

holding the element to be cut up by the holding stops 23, 25, pushing the element to be cut up towards the blade 7 in the raised position by means of the pressure pad 24,
cutting up the element by lowering the blade 7, whilst maintaining the pressure force,
backward movement of the pressure pad and advance of the stop 22 in order to free the element to be cut up and optionally restart the cutting up cycle.

The table has a counterblade 9, in which is fitted a wearing member 10, which is removable and interchangeable, provided with the slot 8 permitting the passage of the blade 7. The counterblade is preferably made from a steel which has undergone nitriding.

Figure 2:
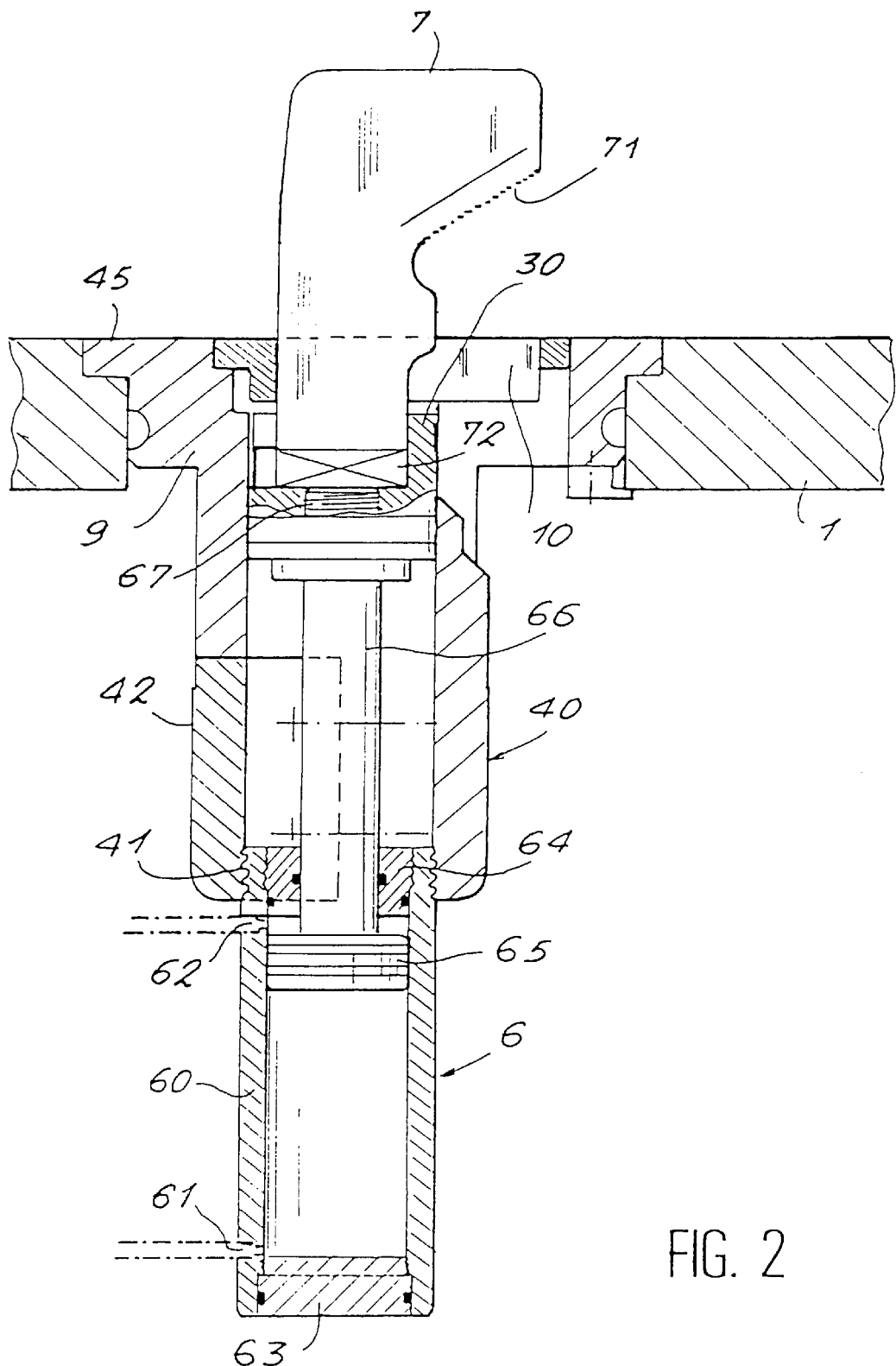
FIG. 2 A sectional view of a detail of the cutting apparatus according to the invention and illustrating the shearing tool control members.
Figure 3:
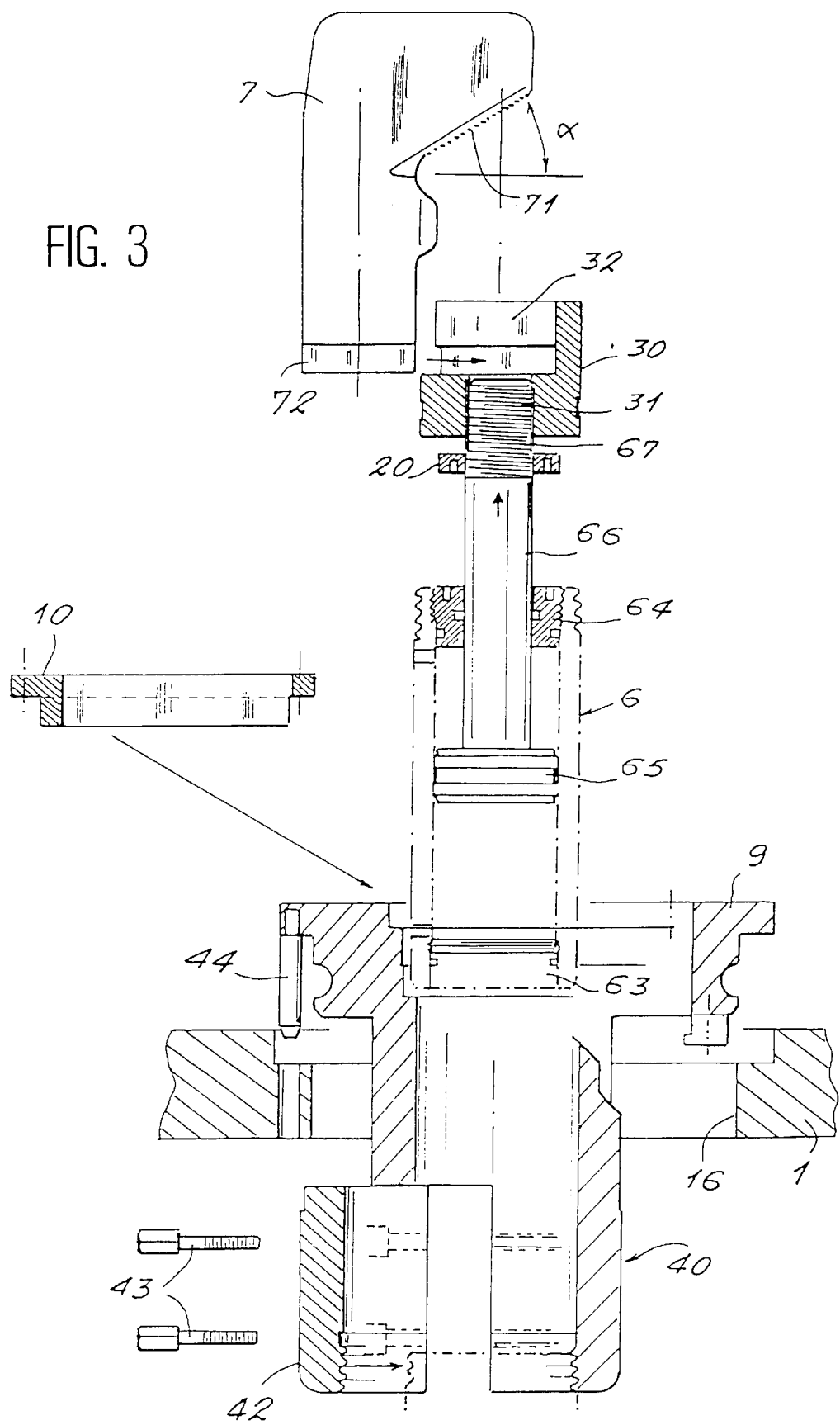
FIG. 3 An exploded view of the detail of the apparatus according to the invention shown in FIG. 2.

FIGS. 2 and 3 illustrate the characteristics of the blade 7 and permit the understanding of its operation.

The jack 6 is a double action jack. It has a body 60 having a fluid intake orifice 61 for extension and a fluid intake orifice 62 for retraction. This fluid is e.g. water. The jack 6 is provided with a lower sealing plug 63 and an upper sealing plug 64 between which the piston 65 can move. The piston 65 is extended by the rod 66 traversing the upper plug 64 and terminated by a threaded part 67.

A connecting member 30 has in its lower portion a tapped hole 31 permitting its assembly with the threaded part 67 of the rod 66, with the interposing of a locknut 20. The upper portion of the connecting member 30 is machined in mortise form 32.

The blade 7 has a lower portion in tenon form 72. This tenon portion is fitted in the mortise portion of the connecting member 30. The jack can then actuate the blade 7 from top to bottom.

As has been stated hereinbefore, the jack 6 is maintained on the table 1 by two not shown pins. Its upper end is joined to the generally cylindrical, hollow part 40 intermediate between the table 1 and the jack 6. The part 40 houses the rod 66 and the connecting member 30. The connection between the jack 6 and the intermediate member 40 is brought about by fitting together the two parts by means of a system of alternating grooves 41. The lower portion of the intermediate member 40 has a dismantlable, semicylindrical shell 42. When the shell 42 is fixed to the intermediate member 40 by screws 43, it ensures the fitting of the jack 6 in the member 40. When the shell 42 is retracted and the jack 6 is detached from the pins for fixing to the table 1, it is then possible to push the jack 6 towards the table in such a way that the connecting member 30 rises and passes out of the upper part of the member 40 (constituting the counterblade 9). It is then possible to free the blade 7 and change it if it has become worn.

The intermediate member 40 is centred in its recess 16 of the table 1 by centering pins such as the pin 44 (cf. FIG. 3). It is then fixed to the table by a series of screws passing through its larger diameter ring 45. The intermediate member 40 can be in one piece. It can also be in two parts, the counterblade 9 being made separately and then welded to the lower portion of the member 40. Thus, the counterblade can be nitrided alone.

The wearing member 10 is e.g. rectangular. Its slot 8 (cf. FIG. 1) is sufficiently long to enable the penetration of the blade 7. The wearing member 10 is fixed by peripheral screwing to the counterblade 9. The upper face of the assembly constituted by the counterblade and the wearing member is in the same plane as the upper face of the table 1.

The blade 7 is advantageously of nickel-chromium-molybdenum steel 60 NCD 11 marketed by Aubert et Duval. The pitch angle α of the blade (cf. FIG. 3) must be carefully determined. Tests have revealed that the angle should be approximately 30°. The cutting edge is preferably slightly serrated.

Figure 4:
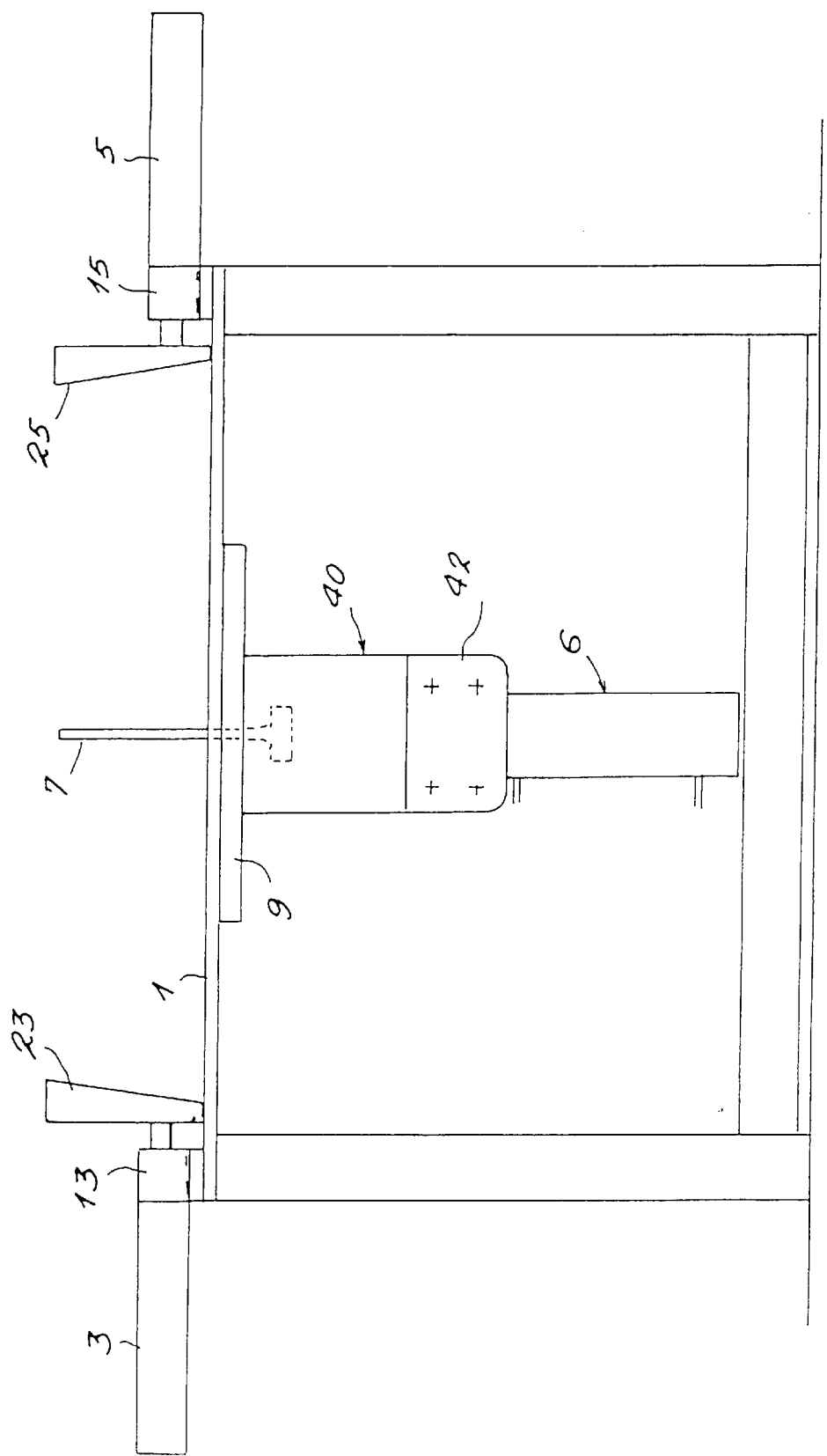
FIG. 4 A view under a different angle of the apparatus according to the invention.
Figure 5:
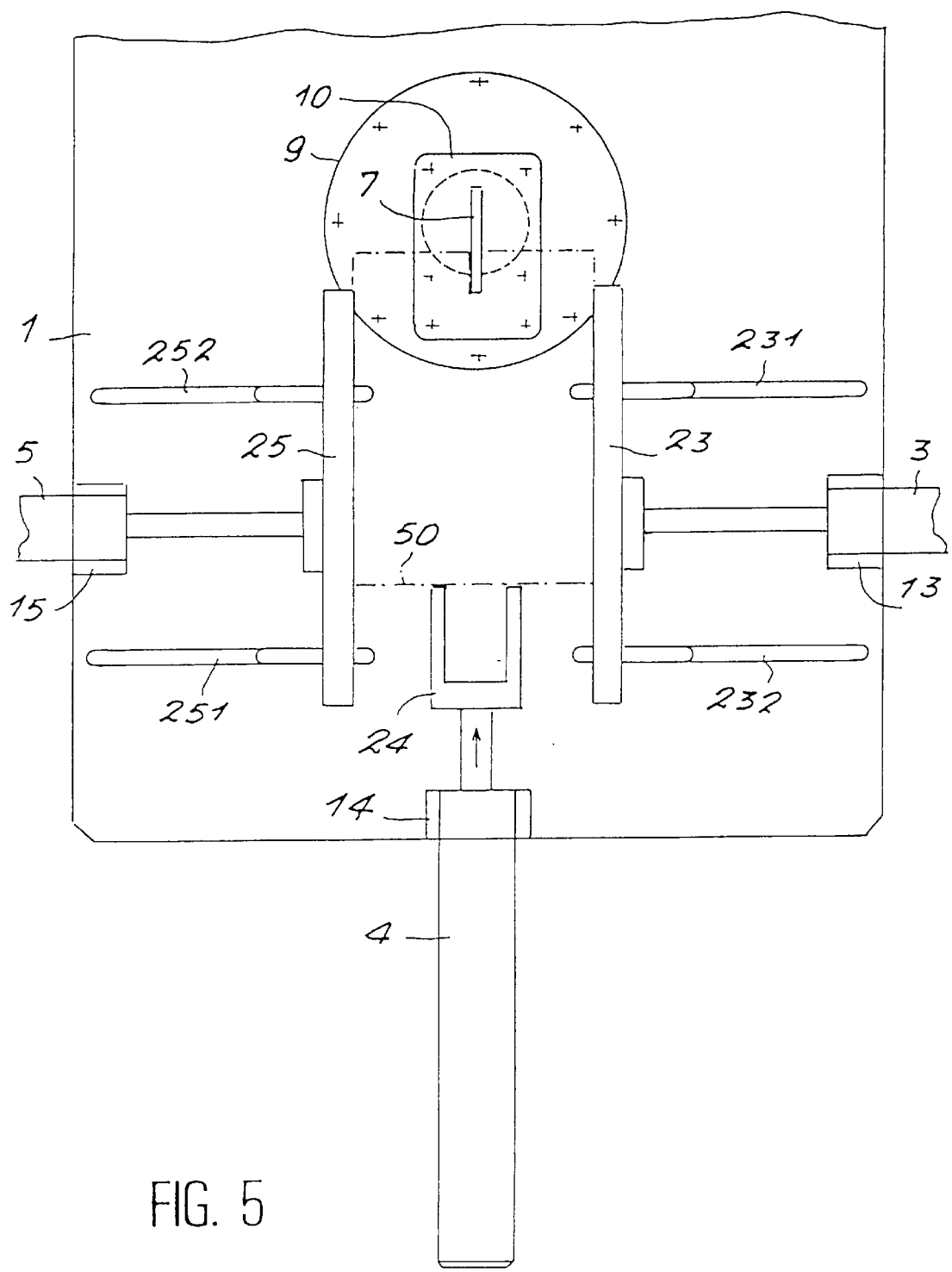
FIG. 5 A partial plan view of the apparatus according to the invention.

FIGS. 4 and 5 show the apparatus according to the invention under different angles to permit a better understanding of the invention. FIG. 5 shows the element 50 to be cut up by its mixed line contour.

Tests were carried out on half a melting pot with a wall thickness of 10 mm; Cuts with a spacing of 80 mm were made between the melting pot fins. Over a period of 7 minutes (handling time included) it is possible to make a 400 mm long cut on this melting pot.

The element to be cut up is put into place with the aid of a lifting unit (not shown). The centering, advance and retraction jacks of the element are firstly in the drawn back position. Only the jack of the blade 7 is in the forward position, i.e. the blade is extended. After depositing the element to be cut up on the table, the two lateral jacks 3 and 5 are actuated in order to place the element in the cutting position, i.e. so that the blade is between two fins if the element to be cut up is a melting pot.

The jack 4 is then actuated to advance the element beneath the blade 7, which is then put into action by the jack 6 to carry out a first cut. When the first cut has been made, the blade remains in the bottom position for the time necessary to free the element by means of the jack 2. Once the stop 22 returns to the retracted position, the blade is returned to the top position and the cutting up cycle can recommence.

I claim:

1. Process using a shearing tool for cutting a metallic element used in the construction of a nuclear installation for the purpose of dismantling, comprising the steps of:
    presenting and maintaining the element in front of a cutting edge of a blade comprising the shearing tool when the tool is in a working position, a pitch angle of the blade being approximately 30°, simultaneously, pushing the element towards the cutting edge and manipulating the tool to carry out a first element shearing operation, at the end of the first shearing operation, drawing back the element from the shearing tool in a direction opposite movement of the element in said step of pushing the element towards the cutting edge and returning the tool to the working position, and repeating the preceding steps to carry out a number of shearing operations if necessary.

2. Apparatus for cutting a metallic element used in the construction of a nuclear installation for the purpose of dismantling, the apparatus comprising a support for receiving the element, the support being equipped with a blade comprising the shearing tool and controllable by control means, the apparatus also incorporating means for maintaining the element in front of a cutting edge of the blade, the blade being inclined by an angle of approximately 30° with respect to the support, means for pushing the element towards the cutting edge, and means for drawing back the element from the shearing tool in a direction opposite advancement of the element by said pushing means.

3. Apparatus according to claim 2, wherein the blade traverses the support, a portion of the support facing the cutting edge serving as a counterblade.

4. Apparatus according to claim 3, wherein a portion of the support facing the cutting edge is provided with a detachable wearing member.

5. Apparatus according to claim 4, wherein the wearing member is provided with a slot enabling the blade to traverse the support.

6. Apparatus according to claim 2, wherein the blade control means incorporate a jack having a rod detachably secured to the blade.

7. Apparatus according to claim 6, wherein a sliding tenon-mortise link is used for rendering the blade detachably secured to the rod of the jack.

8. Apparatus according to claim 2, wherein the maintaining, pushing and drawing back means comprise stops controlled by jacks.

9. Apparatus according to claim 2, wherein the cutting edge of the blade is serrated.

10. Apparatus according to claim 2, wherein the drawing-back means is positioned for moving the element toward the pushing means.

11. A process for cutting a metallic element, comprising the steps of:
    (a) providing a tool reciprocable in a vertical direction, the tool comprising a blade provided with a cutting edge at a pitch angle of approximately 30° with a first horizontal direction in which the blade extends;
    (b) laying the element on a horizontal support;
    (c) pushing the element towards the blade in the first horizontal direction, while guiding the element in a second horizontal direction perpendicular to the first horizontal direction;
    (d) lowering the blade through the element while maintaining a determined effort on the element towards the blade in the first horizontal direction and retaining the element in the second horizontal direction;
    (e) raising the blade above the element; and
    (f) repeating steps (c) to (e) if necessary, until cutting is completed.

12. A process according to claim 11, further comprising the step of drawing back the element in the first horizontal direction after step (d).

13. An apparatus for cutting a metallic element, comprising a horizontal support, a tool comprising a blade provide with a cutting edge extending in the cutting direction at a pitch angle of approximately 30° with a first horizontal direction in which the blade extends, means for reciprocating the tool in a vertical direction, means for pushing then maintaining the element towards the blade in the first horizontal direction with a determined effort, and means for guiding then retaining the element in a second horizontal direction perpendicular to the first horizontal direction.

14. An apparatus according to claim 13, further comprising a means for drawing back the element in the first horizontal direction.

15. An apparatus according to claim 14, wherein the pushing means comprises a jack, and the guiding and retaining means comprise stops and jacks pushing the stops with a pressure lower than a pressure in the jack of the pushing means.

16. An apparatus according to claim 14, wherein the drawing back means comprises a jack.

* * * * *

UNITED STATES PATENT AND TRADEMARK OFFICE
CERTIFICATE OF CORRECTION

PATENT NO. : 5,957,018
DATED : September 28, 1999
INVENTOR(S) : Schultz

It is certified that error appears in the above-indentified patent and that said Letters Patent is hereby corrected as shown below:

Column 6, Line 26, Claim 13 (Line 2), delete "provide" and insert --provided--.

Signed and Sealed this

Eighteenth Day of April, 2000

Attest:

Q. TODD DICKINSON

*Attesting Officer*          *Director of Patents and Trademarks*